United States Patent Office 3,379,752
Patented Apr. 23, 1968

3,379,752
PHENOXY SUBSTITUTED 3-HYDROXYALKA-
NOIC ACIDS AND A METHOD FOR THEIR
PREPARATION
William A. Bolhofer, Frederick, Pa., assignor to Merck &
Co., Inc., Rahway, N.J., a corporation of New Jersey
No Drawing. Filed May 20, 1964, Ser. No. 369,000
28 Claims. (Cl. 260—473)

ABSTRACT OF THE DISCLOSURE

Phenoxyalkanoic acids which are substituted at the 3-carbon of the alkanoic acid moiety by an hydroxy or an oxo radical. Also included are the acid addition salts and esters of the said products. The compounds are hypocholesterolemics useful in the treatment of atherosclerosis.

The 3-hydroxy(phenoxy)alkanoic acids are obtained by the reaction of a phenoxyalkanal with a 2-haloalkanoic acid ester in the presence of a zinc catalyst followed by the hydrolysis of the 3-hydroxy(phenoxy)alkanoic acid ester thus obtained to the corresponding carboxylic acid; and the 3-oxo(phenoxy)alkanoic acid products are synthesized via the oxidation of the aforementioned 3-hydroxy(phenoxy)alkanoic acid ester compounds to their corresponding 3-oxo(phenoxy)alkanoic acid esters which are then hydrolyzed to their carboxylic acid analogs.

This invention relates to a new class of phenoxy substituted 3-hydroxyalkanoic acids, to the alkyl esters thereof, to the corresponding 3-oxo derivatives of the said esters and to a novel method for their preparation.

It is the purpose of this invention to disclose a new class of compounds which possess the property of retarding blood lipid deposition in the arterial wall and which may be employed as chemotherapeutic agents in the treatment of atherosclerosis.

Numerous studies support the concept that cholesterol plays a major role in the pathogenesis of atherosclerosis because along with other lipids and fibrin it is the substance that accumulates in the intima and subintima and produces arterial corrosion. Therefore, the search for agents which will effect a reduction in serum chloresterol has long been an object of those skilled in the art and has led to the development of a wide variety of compounds having hypocholesterolemic activity. Among these chemotherapeutic agents are the N-carboxyalkyl-phenoxy-(and anilino)alkanoic acid amides of my copending application Ser. No. 341,421, filed Jan. 30, 1964, and the phenoxy(and phenylthio)alkanoic acids of my copending application Ser. No. 353,579, filed Mar. 20, 1964, now abandoned which have been shown to effectively reduce the concentration of cholesterol in blood serum and thus ameliorate the condition associated with blood lipid deposition.

It has now been discovered that a new class of compounds, which may be identified as phenoxy substituted 3-hydroxyalkanoic acids, are also useful in the treatment of atherosclerosis and, in comparison with other known compounds, compare most favorably in protecting against induced hypercholesterolemia by effecting a reduction in the concentration of cholesterol in serum.

The novel carboxylic acids of this invention are compounds having the following structural formula:

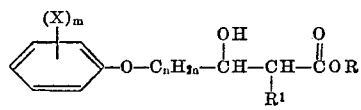

I wherein R and $R^1$ each represents a member selected from the group consisting of hydrogen and lower alkyl, e.g., methyl, ethyl, etc.; X is a member selected from the group consisting of halogen, e.g., chlorine, bromine, fluorine, etc., lower alkyl, e.g., methyl, ethyl, etc., halo-lower alkyl, e.g., trihalomethyl such as trifluoromethyl, etc., cycloalkyl, e.g., mononuclear cycloalkyl containing 5–6 nuclear carbon atoms such as cyclopentyl, cyclohexyl, etc., lower alkoxy, e.g., methoxy, ethoxy, etc., lower alkylthio, e.g., methylthio, ethylthio, etc., aryl, e.g., phenyl, tolyl, xylyl, etc., aralkyl, e.g., benzyl, phenethyl, etc., aryloxy, e.g., phenoxy, etc., aralkoxy, e.g., benzyloxy, etc., alkenyl, e.g., lower alkenyl such as vinyl, allyl, etc., aralkenyl, e.g., styryl, etc., and, taken together, two X radicals on adjacent carbon atoms of the benzene ring may be combined to form an hydrocarbylene chain (i.e., a divalent organic radical composed solely of carbon and hydrogen) containing from three to four carbon atoms between their points of attachment, for example, 1,3-butadienylene (i.e., —CH=CH—CH=CH—), etc.; $m$ is an integer having a value of 0–3 and $n$ is an integer having a value of 1–5.

Included within the scope of this invention are the acid addition salts of the instant phenoxy substituted 3-hydroxyalkanoic acids, which are prepared by the reaction of the said alkanoic acids with a base having a non-toxic, pharmacologically acceptable cation. Suitable bases include, for exmple, the alkali metal and alkaline earth metal hydroxides, carbonates, etc., ammonia, primary, secondary and tertiary amines such as monoalkylamines, dialkylamines, trialkylamines, nitrogen containing heterocyclic amines, e.g., piperidine, etc. The acid addition salts thus produced are the functional equivalent of the corresponding alkanoic acid products and one skilled in the art will appreciate that to the extent that the alkanoic acids of the invention are useful in therapy, the variety of acid addition salts embraced by this invention are limited only by the criterion that the bases employed in forming the salts be both non-toxic and pharmacologically acceptable.

A preferred subgroup of compounds within the scope of this invention are the alkanoic acids of the following formula:

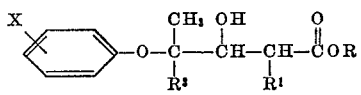

wherein R, R¹ and R³ each represents a number selected from the group consisting of hydrogen and lower alkyl and X is halogen; preferably, however, the R³ radical is a lower alkyl group such as methyl, etc. Also included within the scope of the preferred embodiment are the functionally equivalent non-toxic, pharmacologically acceptable acid addition salts of the phenoxy substituted 3-hydroxyalkanoic acids described above. The above class of compounds exhibits particularly good hypocholesterolemic activity and represents a preferred subgroup of compounds within the scope of this invention.

The products of this invention are prepared by the reaction of an appropriately substituted alkanal (III, infra) with a 2-haloalkanoic acid ester in the presence of a zinc catalyst. The process, however, proceeds in stages and results, first, in the formation of an intermediate zinc addition complex which must be decomposed by hydrolysis to the desired product. The catalyst employed may be zinc in any one of a wide variety of its forms as, for example, zinc in the form of a dust, zinc foil, mossy zinc or zinc in granular form. Essentially, the surface of the zinc must be kept clean and, preferably, the zinc catalyst should be as pure as possible since variations in the quality of the catalyst have a bearing on the yield and ease of purification of the final product. Generally, the zinc catalyst should be purified prior to its use in the reaction by successive washings with suitable reagents as, for example, by washing with hydrochloric acid, water, acetone and then with absolute ether. The following equation illustrates the process:

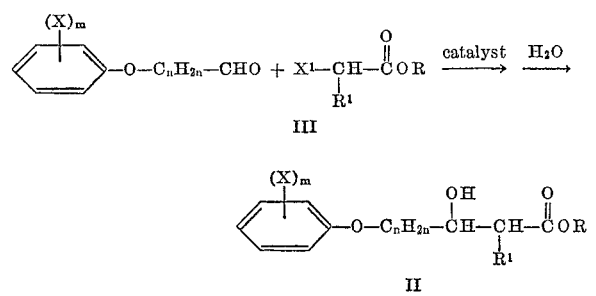

wherein R¹, X, $m$ and $n$ are as defined above, R is lower alkyl, e.g., methyl, ethyl, etc. and X¹ is halogen, e.g., chlorine, bromine, etc. If desired, the lower alkyl ester compound (II) thus formed may be hydrolyzed to the corresponding carboxylic acid product by conventional means as, for example, by treating the said ester derivative with an aqueous solution of a base, e.g., an aqueous solution of sodium hydroxide:

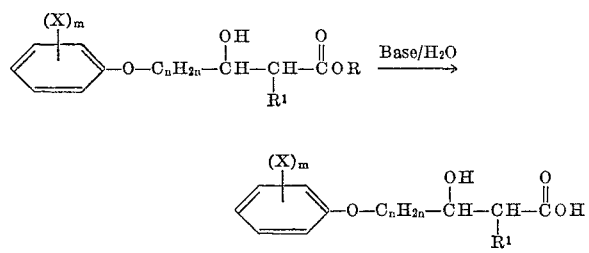

wherein R, R¹, X, $m$ and $n$ are as defined above. The choice of a solvent and a suitable reaction temperature are not particularly critical aspects of the process but, generally, it is preferable to employ some solvent and to conduct the reaction at reflux temperatures since raised temperatures shorten the reaction time and the use of a solvent facilitates stirring and allows for a more effective control of the temperature. Suitable solvents include, for example, benzene, ethyl, ether, butyl ether, xylene and toluene or, mixtures thereof as, for example, a mixture of benzene and ethyl ether or a mixture of benzene and toluene.

The phenoxy substituted alkanals (III) employed as starting materials in the instant process may be prepared by methods well-known to those skilled in the art. Generally, however, I have found it most convenient to prepare the said alkanals from their corresponding phenoxyalkanoic acids (V, infra) by treatment of the latter with lithium aluminum hydride in anhydrous ethyl ether, followed by the oxidation of the phenoxy substituted alkanol compound (IV, infra) thus formed to the appropriate aldehyde (III). A mixture of dicyclohexylcarbodiimide and anhydrous dimethyl sulfoxide has shown itself to be a most suitable oxidation reagent with which to convert the alkanol intermediate to the desired aldehyde but it will be apparent to those skilled in the art that any one of a wide variety of oxidizing agents may also be employed with good results. The following equation illustrates this method of preparation:

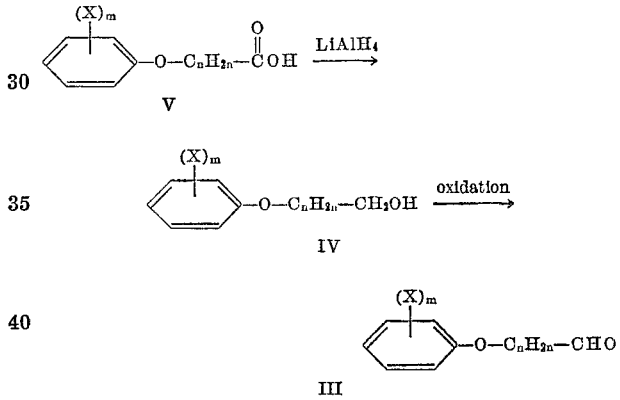

wherein X, $m$ and $n$ are as defined above.

As indicated above, the compounds of this invention are useful in the treatment of atherosclerosis by virtue of their ability to reduce the concentration of cholesterol in blood serum. However, it has also been found that the ester derivatives of the instant phenoxy substituted 3-hydroxy-alkanoic acids are useful as chemical intermediates and may be oxidized to produce the corresponding phenoxy substituted 3-oxo-alkanoic acid esters. Thus, ethyl 4-(4-chlorophenoxy)-3-hydroxy-4-methylvalerate and ethyl 4 - (4 - chlorophenoxy) - 3-hydroxy-2,4-dimethylvalerate, which have been prepared infra according to the process of this invention, may be oxidized with chromic acid and chromium trioxide, respectively, to produce their corresponding ethyl 4 - (4 - chlorophenoxy)-3-keto-4-methylvalerate and ethyl 4-(4-chlorophenoxy) - 3 - keto-2,4-dimethylvalerate derivatives. The 3-oxo derivatives thus produced are also novel compounds and their close similarity in structure to the hydroxy precursors from which they are synthesized recommends them as pharmaceuticals having potentially valuable pharmacological properties.

The following examples illustrate the method of preparing the phenoxy substituted 3-hydroxyalkanoic acids, esters and 3-oxoalkanoic acid esters of the invention. However, the examples are illustrative only and are not to be construed as limiting the invention thereto. One skilled in the art will readily perceive that, by substituting the appropriate aldehyde and 2-haloalkanoic acid ester reactants for those employed in the following examples, all of the products falling within the scope of Formula I supra may be prepared.

Example 1.—Ethyl 4-(4-chlorophenoxy)-3-hydroxy-4-methylvalerate

Step A: 2 - (4 - chlorophenoxy) - 2-methylpropionaldehyde.—2-(4-chlorophenoxy)-2-methylpropanol (40.0 g., 0.20 mole) and 170 g. (0.80 mole) of dicyclohexylcarbodiimide are dissolved in 800 ml. of anhydrous dimethyl sulfoxide in a three-neck, round-bottom flask fitted with a drying tube and mechanical stirrer. Stirring is begun and the mixture is warmed on steam until a solution is obtained. Phosphoric acid (8.0 ml. of an 85% solution) is added and stirring and heating on the steam bath continued for one hour. A white solid precipitates during this heating period. The heating is then terminated and the mixture stirred at room temperature for sixteen hours. Finally, the mixture is heated on steam and stirred an additional hour. Then, while heating and stirring are continued, 50 ml. of water is added dropwise over one hour in order to decompose the excess carbodiimide. After cooling, the solid, is removed by filtration, washed thoroughly with 1500 ml. of water and the water washings are added to the dimethyl sulfoxide solution. The solid is then washed with one liter of ether. The combined filtrate from the reaction mixture and water washings are extracted with the ether washings and the resulting ether extracts are dried over anhydrous magnesium sulfate and then evaporated. The residue consists of a light yellow oil which is distilled in vacuo, yielding 32.5 g. (82%) of a water-white oil, B.P. 81–85° C./0.5 mm. Careful redistillation gives 31.5 g. (80%) of 2-(4-chlorophenoxy)-2-methylpropionaldehyde, B.P. 82–83° C./0.5 mm.

Step B: Ethyl 4 - (4 - chlorophenoxy) - 3 - hydroxy-4-methylvalerate.—Activated zinc metal granules (10 g., 0.15 mole), which are prepared by washing the zinc granules with a 1% hydrochloric acid solution, water, acetone and finally with ethyl ether and then drying at 110° C. for 24 hours, are placed in a one-liter, four-neck, round-bottom flask fitted with a mechanical stirrer, reflux condenser and drying tube, dropping funnel, and nitrogen gas inlet tube. The flask is swept out with dry nitrogen gas and a solution of 20 g. (0.10 mole) of 2-(4-chlorophenoxy)-2-methylpropionaldehyde and 20 g. (0.12 mole) of ethyl bromoacetate dissolved in a mixture of 200 ml. of dry benzene and 500 ml. of ethyl ether, is placed in the dropping funnel. About 50 ml. of the solution is added, stirring is begun and the mixture is heated on a steam bath to reflux. The mixture is then stirred and heated on a steam bath over one hour while the remainder of the solution is added dropwise. Finally, the mixture is stirred and reflux maintained for two additional hours.

The final mixture is hydrolyzed by the addition of 500 ml. of 0.25 N hydrochloric acid. The resulting layers are separated and the water phase washed with ethyl ether. These washings are combined with the organic phase, and the whole dried and evaporated. A light yellow oil is obtained, which is distilled in vacuo to obtain 19.0 g. (66%) of ethyl 4-(4-chlorophenoxy)-3-hydroxy-4-methylvalerate as a water-white oil, B.P. 160–162° C./1.0 mm.

Example 2.—Ethyl 4-(4-chlorophenoxy)-3-keto-4-methylvalerate

A chromic acid oxidizing solution is prepared by dissolving 133.5 g. (1.33 mole) of chromium trioxide in 250 ml. of water and adding 115 ml. of concentrated sulfuric acid. This solution (20 ml.) is added dropwise over 30 minutes to a well-stirred solution of 14.0 g. (0.05 mole) of ethyl 4-(4-chlorophenoxy)-3-hydroxy-4-methylvalerate in 150 ml. of acetone maintained at 0° C. in ice in a 500-ml., three-neck, round-bottom flask fitted with a mechanical stirrer, low temperature thermometer and a dropping funnel. When the addition is complete, the ice-bath is removed and the mixture is stirred and allowed to warm slowly to room temperature over 20 hours. Excess isopropyl alcohol is added to remove the unreacted chromic acid and the whole stirred an additional two hours at room temperature. Finally, the mixture is filtered and the green chromium salts are washed well with acetone. The combined filtrate and washings are concentrated to a volume of 50 ml. and poured into 400 ml. of water. The resulting mixture is extracted with ethyl ether and the extracts dried and evaporated to obtain a light yellow oil. The yellow oil is then distilled in vacuo to obtain 4.7 g. (33%) of ethyl 4-(4-chlorophenoxy)-3-keto-4-methylvalerate as a faintly yellow oil, B.P. 137–140° C./0.5 mm.

Example 3.—4-(4-chlorophenoxy)-3-hydroxy-4-methylvaleric acid

Ethyl 4 - (4-chlorophenoxy)-3-hydroxy-4-methylvalerate (17.1 g., 0.60 mole) is mixed with 250 ml. of a 5% sodium hydroxide solution in a 500 ml. round-bottom flask fitted with a mechanical stirrer. The mixture is heated for approximately one hour on a steam bath and stirred until a clear solution is obtained. The solution is treated with decolorizing carbon while still hot, and then cooled to 0° to 5° C. The resulting solid is taken up in hot water and acidified with an hydrochloric acid solution while still hot. Upon cooling, 14.5 g. (94%) of 4-(4-chlorophenoxy)-3-hydroxy-4-methylvaleric acid is obtained as a white solid, M.P. 129–131° C.

Example 4.—Ethyl 4-(4-chlorophenoxy)-3-hydroxy-2,4-dimethylvalerate

Eethyl 4 - (4-chlorophenoxy)-3-hydroxy-2,4-dimethylvalerate is prepared by following substantially the procedure described in Example 1, except that 20 g. (0.10 mole) of 2-(4-chlorophenoxy)-2-methylpropionaldehyde, 22 g. (0.12 mole) of ethyl 2-bromopropionate and 10 g. (0.15 mole) of zinc granules are substituted for the corresponding propionaldehyde, ethyl 2-bromoacetate and zinc reactants employed therein. All other quantities of the reactants employed are identical to those of Example 1. The product, 19 g. (63%) of ethyl 4-(4-chlorophenoxy)-3-hydroxy-2,4-dimethylvalerate, is obtained as a water-white oil, B.P. 147–149° C./0.5 mm.

Saponification of the ethyl 4-(4-chlorophenoxy)-3-hydroxy-2,4-dimethylvalerate, according to the procedure described in Example 3, yields the product 4-(4-chlorophenoxy)-3-hydroxy-2,4-dimethylvaleric acid.

Example 5.—Ethyl 4-(4-chlorophenoxy)-3-keto-2,4-dimethylvalerate

This product is prepared by following substantially the procedure described in Example 2 except that 13 g. (0.04 mole) of ethyl 4-(4-chlorophenoxy)-3-hydroxy-2,4-dimethylvalerate and 20 ml. of chromic acid oxidizing solution are substituted for the corresponding ethyl 4-(4-chlorophenoxy)-3-hydroxy-4-methylvalerate and chromium trioxide reactants employed therein. All other quantities of the reactants employed are identical to those of Example 2. The product 8.3 g. (64%) of ethyl 4-(4-chlorophenoxy)-3-keto-2,4-dimethylvalerate, is obtained as a water-white oil, B.P. 136–138° C./1.0 mm.

By substituting the appropriate phenoxy substituted alkanal and 2-haloalkanoate reactants for the 2-(4-chlorophenoxy)-2-methylpropionaldehyde and ethyl bromoacetate starting materials of Example 1 and following substantially the procedure described therein, the corresponding phenoxy substituted 3-hydroxyalkanoic acid ester products are prepared. The esters thus produced may then be converted to their corresponding carboxylic acids by saponifying the former according to the procedure described in Example 3. The following equations illustrate these reactions and the accompanying Table I depicts the phenoxy substituted 3-hydroxyalkanoic acid esters and the corresponding carboxylic acids produced thereby:

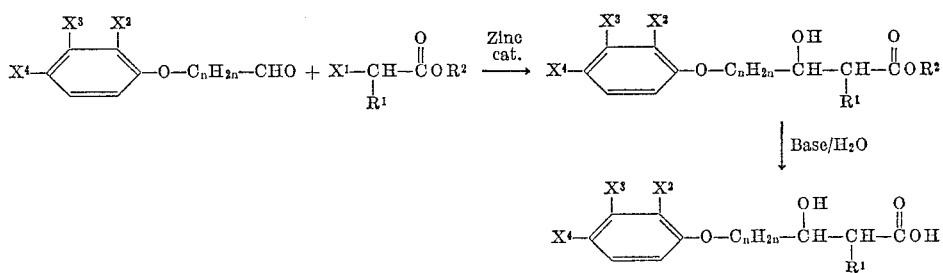

TABLE I

| Example | $-C_nH_{2n}-$ | $R^1$ | $R^2$ | $X^1$ | $X^2$ | $X^3$ | $X^4$ |
|---|---|---|---|---|---|---|---|
| 6 | $-C(CH_3)_2-$ | H | $-C_2H_5$ | Cl | H | Cl | H |
| 7 | $-C(CH_3)_2-$ | $-CH_3$ | $-CH_3$ | Br | H | H | $-CH_3$ |
| 8 | $-CHCH_3-$ | $-C_4H_9$ | $-C_2H_5$ | Br | H | H | $-CCH_3$ |
| 9 | $-C(CH_3)_2-$ | $-CH_3$ | $-C_2H_5$ | Cl | –⟨C₆H₅⟩ | H | H |
| 10 | $-CHC_2H_5-$ | $-C_2H_5$ | $-CH_3$ | Br | $-CH_2-$⟨C₆H₅⟩ | H | H |
| 11 | $-CH_2-$ | $-CH_3$ | $-C_2H_5$ | I | H | H | $-O-$⟨C₆H₅⟩ |
| 12 | $-CH_2-CH_2-$ | $-C_2H_7$ | $-C_2H_5$ | Br | $-O-CH_2-$⟨C₆H₅⟩ | H | H |
| 13 | $-C(C_2H_5)_2-$ | $-CH_3$ | $-CH_3$ | Cl | H | $-CF_3$ | H |
| 14 | $-CH_2-$ | $-C_2H_5$ | $-C_3H_7$ | Cl | $-CH=CH_2$ | H | H |
| 15 | $-C(CH_3)_2-$ | H | $-C_2H_5$ | Br | Cl | H | Cl |
| 16 | $-C(CH_3)_2-$ | $-CH_3$ | $-C_3H_7$ | Br | H | $-CH_3$ | Cl |
| 17 | $-C(CH_3)(C_2H_5)-$ | H | $-C_2H_5$ | Br | H | H | Cl |
| 18 | $-CHCH_3-$ | H | $-CH_3$ | Br | H | H | Cl |
| 19 | $-C(CH_3)_2-$ | $-CH_3$ | $-C_4H_9$ | Cl | H | H | $-O-CH_2-$⟨C₆H₅⟩ |
| 20 | $-C(CH_3)_2-$ | $-C_4H_9$ | $-C_2H_5$ | Br | $-CH=CH-CH=CH-$ | | H |
| 21 | $-CH_2-$ | $-C_2H_7$ | $-C_3H_7$ | Br | H | H | $-CH=CH-$⟨C₆H₅⟩ |
| 22 | $-C(CH_3)_2-$ | $-CH_3$ | $-C_2H_5$ | Br | H | H | ⟨thienyl-S⟩ |
| 23 | $-C(CH_3)(C_3H_7)-$ | H | $-C_2H_5$ | Cl | $-SCH_3$ | H | H |
| 24 | $-C(CH_3)_2-$ | $-CH_3$ | $-CH_3$ | I | $-CH_3$ | H | $-CH_3$ |
| 25 | $-C(CH_3)_2-$ | H | $-C_3H_7$ | Br | $-OCH_3$ | H | $-CH_2-CH=CH_2$ |
| 26 | $-C(CH_3)_2-$ | $-CH_3$ | $-C_3H_7$ | Br | $-OCH_3$ | H | $-CH=CH-CH_3$ |
| 27 | $-C(CH_3)_2-$ | H | $-C_2H_5$ | Cl | H | $-CH_3$ | $-CH_3$ |

It will be apparent from the foregoing description that the phenoxy substituted 3-hydroxyalkanoic acids and their esters constitute a valuable class of compounds which have not been prepared heretofore. One skilled in the art will also appreciate that the processes disclosed in the above examples are merely illustrative and are capable of wide variation and modification without departing from the spirit of this invention.

What is claimed is:

1. A compound of the formula:

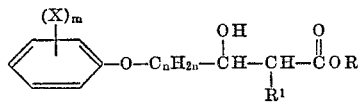

wherein R and $R^1$ each represents a member selected from the group consisting of hydrogen and lower alkyl; X is a member selected from the group consisting of halogen, lower alkyl, trifluoromethyl, cycloalkyl, lower alkoxy, lower alkylthio, mononuclear aryl, mononuclear aralkyl, mononuclear aryloxy, mononuclear aralkoxy, alkenyl, mononuclear aralkenyl and, taken together, two X radicals on adjacent carbon atoms of the benzene ring may be combined to form an hydrocarbylene chain containing from three to four carbon atoms between their points of attachment; $m$ is an integer having a value of 1–3 and $n$ is an integer having a value of 1–5.

2. A compound of the formula:

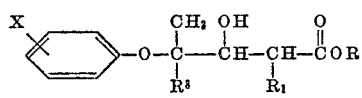

wherein R, $R^1$ and $R^3$ each represents a member selected from the group consisting of hydrogen and lower alkyl and X is halogen.

3. A compound of the formula:

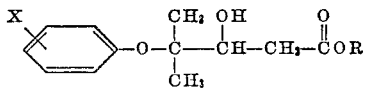

wherein R is lower alkyl and X is halogen.

4. A compound of the formula:

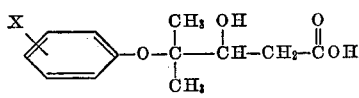

wherein X is halogen.

5. A compound of the formula:

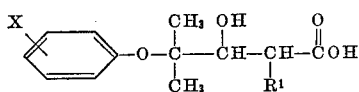

wherein $R^1$ is lower alkyl and X is halogen.

6. A compound of the formula:

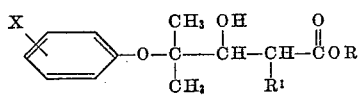

wherein R and $R^1$ are lower alkyl and X is halogen.

7. Ethyl 4 - (4 - chlorophenoxy) - 3 - hydroxy - 4 - methylvalerate.

8. 4 - (4 - chlorophenoxy) - 3 - hydroxy - 4 - methylvaleric acid.

9. Ethyl 4 - (4 - chlorophenoxy) - 3 - hydroxy - 2,4 - dimethylvalerate.

10. 4 - (4 - chlorophenoxy) - 3 - hydroxy - 2,4 - dimethylvaleric acid.

11. A compound of the formula:

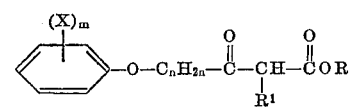

wherein R is lower alkyl; $R^1$ is a member selected from the group consisting of hydrogen and lower alkyl; X is a member selected from the group consisting of halogen, lower alkyl, trifluoromethyl, cycloalkyl, lower alkoxy, lower alkylthio, mononuclear aryl mononuclear aralkyl, mononuclear aryloxy, mononuclear aralkoxy, mononuclear alkenyl, aralkenyl and, taken together, two X radicals on adjacent carbon atoms of the benzene ring may be combined to form an hydrocarbylene chain containing from three to four carbon atoms between their points of attachment; m is an integer having a value of 1–3 and n is an integer having a value of 1–5.

12. A compound of the formula:

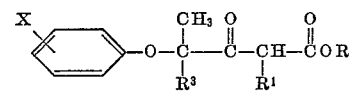

wherein R is lower alkyl; $R^1$ and $R^3$ each represents a member selected from the group consisting of hydrogen and lower alkyl and X is halogen.

13. A compound of the formula:

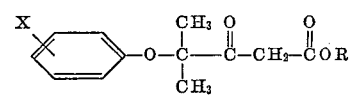

wherein R is lower alkyl and X is halogen.

14. A compound of the formula:

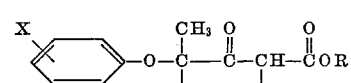

wherein R and $R^1$ are lower alkyl and X is halogen.

15. Ethyl 4 - (4 - chlorophenoxy) - 3 - keto - 4 - methylvalerate.

16. Ethyl 4 - (4 - chlorophenoxy) - 3 - keto - 2,4 - dimethylvalerate.

17. A process for preparing a compound of the formula:

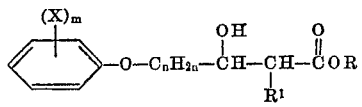

wherein R is lower alkyl; $R^1$ is a member selected from the group consisting of hydrogen and lower alkyl; X is a member selected from the group consisting of halogen, lower alkyl, trifluoromethyl, cycloalkyl, lower alkoxy, lower alkylthio, mononuclear aryl, mononuclear aralkyl, mononuclear aryloxy, mononuclear aralkoxy, alkenyl, mononuclear aralkenyl and, taken together, two X radicals on adjacent carbon atoms of the benzene ring may be combined to form an hydrocarbylene chain containing from three to four carbon atoms between their points of attachment; m is an integer having a value of 1–3 and n is an integer having a value of 1–5; which comprises the reaction of a compound of the formula:

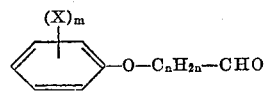

wherein X, m and n are as defined above, with a compound of the formula:

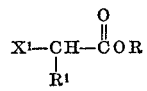

wherein R and $R^1$ are as defined above and $X^1$ is halogen; in the presence of a zinc catalyst and hydrolyzing the resulting zinc complex to the desired product.

18. The process of claim 17 wherein the esterified product thus produced is hydrolyzed to the corresponding carboxylic acid.

19. A process for preparing a compound of the formula:

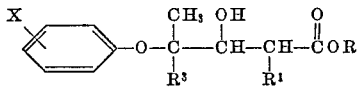

wherein R is lower alkyl; $R^1$ and $R^3$ each represents a member selected from the group consisting of hydrogen and lower alkyl and X is halogen; which comprises the reaction of a compound of the formula:

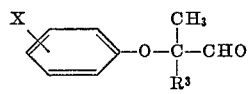

wherein $R^3$ and X are as defined above, with a compound of the formula:

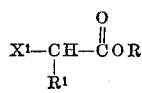

wherein R and $R^1$ are as defined above and $X^1$ is halogen; in the presence of a zinc catalyst and hydrolyzing the resulting zinc complex to the desired product.

20. The process of claim 19 wherein the esterified product thus produced is hydrolyzed to the corresponding carboxylic acid.

21. A process for preparing a compound of the formula:

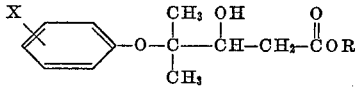

where R is lower alkyl and X is halogen; which comprises the reaction of a compound of the formula:

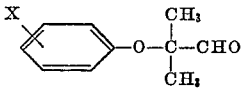

wherein X is as defined above, with a compound of the formula:

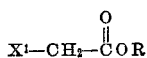

wherein R is as defined above and $X^1$ is halogen; in the presence of a zinc catalyst and hydrolyzing the resulting zinc complex to the desired product.

22. The process of claim 21 wherein the esterified product thus produced is hydrolyzed to the corresponding carboxylic acid.

23. A process for preparing a compound of the formula:

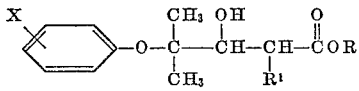

wherein R and $R^1$ are lower alkyl and X is halogen; which comprises the reaction of a compound of the formula:

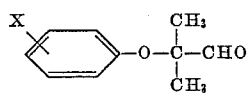

wherein X is as defined above, with a compound of the formula:

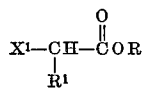

wherein R and $R^1$ are as defined above and $X^1$ is halogen; in the presence of a zinc catalyst and hydrolyzing the resulting zinc complex to the desired product.

24. The process of claim 23 wherein the esterified product thus produced is hydrolyzed to the corresponding carboxylic acid.

25. A process for preparing ethyl 4-(4-chlorophenoxy)-3-hydroxy-4-methylvalerate which comprises the reaction of 2-(4-chlorophenoxy)-2-methylpropionaldehyde with ethyl bromoacetate in the presence of a zinc catalyst and hydrolyzing the resulting zinc complex to the desired product.

26. A process for preparing 4-(4-chlorophenoxy)-3-hydroxy-4-methylvaleric acid which comprises the saponification of ethyl 4-(4-chlorophenoxy)-3-hydroxy-4-methylvalerate.

27. A process for preparing ethyl 4-(4-chlorophenoxy)-3-hydroxy-2,4-dimethylvalerate which comprises the reaction of 2-(4-chlorophenoxy)-2-methylpropionaldehyde with ethyl 2-bromopropionate in the presence of a zinc catalyst and hydrolyzing the resulting zinc complex to the desired product.

28. A process for preparing 4-(4-chlorophenoxy)-3-hydroxy-2,4-dimethylvaleric acid which comprises the saponification of ethyl 4-(4-chlorophenoxy)-3-hydroxy-2,4-dimethylvalerate.

References Cited

Dey, A. N.: Chemical Society Journal (1937), pp. 1057–65.

HENRY R. JILES, *Primary Examiner.*

S. B. WILLIAMS, D. STENZEL, *Assistant Examiners.*